(12) United States Patent
Gouwang

(10) Patent No.: US 12,444,154 B2
(45) Date of Patent: Oct. 14, 2025

(54) SYSTEM AND METHOD FOR DETECTING OBJECT

(71) Applicant: VIA TECHNOLOGIES, INC., New Taipei (TW)

(72) Inventor: DingZhi Gouwang, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 139 days.

(21) Appl. No.: 18/592,564

(22) Filed: Mar. 1, 2024

(65) Prior Publication Data

US 2025/0157171 A1 May 15, 2025

(30) Foreign Application Priority Data

Nov. 13, 2023 (TW) .................................. 112143639

(51) Int. Cl.
*G06V 10/20* (2022.01)
*G06T 3/40* (2024.01)

(52) U.S. Cl.
CPC ................ *G06V 10/20* (2022.01); *G06T 3/40* (2013.01)

(58) Field of Classification Search
None
See application file for complete search history.

(56) References Cited

U.S. PATENT DOCUMENTS

| 2017/0076438 | A1  | 3/2017 | Kottenstette et al. |
| 2023/0260080 | A1* | 8/2023 | Song ............... G06V 10/764 382/100 |

* cited by examiner

*Primary Examiner* — Peter Hoang
(74) *Attorney, Agent, or Firm* — WPAT, PC

(57) ABSTRACT

A method and system for detecting object is described. The method obtains a target image with a first resolution; converts the target image into a transition image with a second resolution, wherein the second resolution is lower than the first resolution; generates a preprocessed image by replacing a predetermined amount of pixel data included in a specific transition image area of the transition image with the predetermined amount of pixel data included in a specific target image area of the target image; determines whether an object complying with at least one predetermined condition exists in the preprocessed image; and generates an indication signal for indicating a position of the object when the object is determined to be existed in the preprocessing image.

10 Claims, 6 Drawing Sheets

SYSTEM AND METHOD FOR DETECTING OBJECT

FIELD OF THE INVENTION

The present invention relates to a technical field of object detection. More specifically, the present invention relates to a system and method for detecting object by using video data of different resolutions.

BACKGROUND OF THE INVENTION

In the technical field of object detection, the resolution of the image data which is the object of analysis is a very important parameter. In one point of view, because the details in high-resolution images are sharper than those in low-resolution images, it is possible to detect smaller objects or objects farther away from the shooting location while analyzing higher-resolution images. However, in another point of view, because the amount of data in high-resolution images is much larger than that in low-resolution images, the computational cost applied for analyzing high-resolution images would be much higher than that applied for analyzing low-resolution images, i.e., better equipment or more time would be required.

SUMMARY OF THE INVENTION

One of the objects of the present invention is to provide a method for detecting object, wherein object detection is performed by analyzing the image in which contents in specific locations are provided with different resolutions such that capability of object detection could be improved even if the increased computational cost is limited or object detection module applied therein is not changed.

Another one of the objects of the present invention is to provide a system for detecting object to realize the method for detecting object described in the disclosure.

In one aspect, the present invention provides a system for detecting object, wherein the system comprises an image generating apparatus, an image preprocessing apparatus and an object identification apparatus. The image generating apparatus is adapted to generate a target image corresponding to a target area. The image preprocessing apparatus is electrically coupled to the image generating apparatus to receive the target image generated by the image generating apparatus, wherein, by the image preprocessing apparatus, the target image with a first resolution is converted into a transition image with a second resolution, and a preprocessed image is generated by replacing a predetermined amount of pixel data included in a specific transition image area of the transition image with the predetermined amount of pixel data included in a specific target image area of the target image. The object identification apparatus is electrically coupled to the image preprocessing apparatus to receive the preprocessed image generated thereby and, while an object complying with at least one predetermined condition is determined to be existed in the preprocessed image, generates an indication signal for indicating a position of the object. Wherein, the second resolution is lower than the first resolution.

In one embodiment, the specific target image area is located at upper middle of the target image, and the specific transition image area is located at upper left corner or upper right corner of the transition image.

In one embodiment, the system further comprises a display apparatus, wherein the display apparatus is electrically coupled to the image preprocessing apparatus and the object identification apparatus, the display apparatus receives the preprocessed image from the image preprocessing apparatus, receives the indication signal from the object identification apparatus, and determines, in accordance with the indication signal, how the preprocessed image is adjusted before displaying the preprocessed image. In a further embodiment, the display apparatus displays the object in the preprocessed image in a conspicuous manner when the indication signal indicates that the object exists.

In one embodiment, the specific target image area comprises a first specific target image subarea and a second specific target image subarea, and the first specific target image subarea is partially overlapped with the second specific target image subarea.

In another aspect, the present invention provides a method for detecting object, wherein the method comprises obtaining a target image with a first resolution; converting the target image into a transition image with a second resolution, wherein the second resolution is lower than the first resolution; generating a preprocessed image by replacing a predetermined amount of pixel data included in a specific transition image area of the transition image with the predetermined amount of pixel data included in a specific target image area of the target image; determining whether an object complying with at least one predetermined condition exists in the preprocessed image; and generating an indication signal for indicating a position of the object when the object is determined to be existed in the preprocessing image.

In one embodiment, the specific target image area is set to be located at upper middle of the target image, and the specific transition image area is set to be located at upper left corner or upper right corner of the transition image.

In one embodiment, the method further determines, in accordance with the indication signal, how the preprocessed image is adjusted before being displayed. In a further embodiment, the object in the preprocessed image is displayed in a conspicuous manner when the indication signal indicates that the object exists.

In one embodiment, the specific target image area comprises a first specific target image subarea and a second specific target image subarea, and the first specific target image subarea is partially overlapped with the second specific target image subarea.

In summary, the method and system provided in the present invention could generate a preprocessed image in which the resolution of an object within a specific transition image area is difference from the resolution of the same object in the areas other than the specific transition image area. Accordingly, object detection performed by the method and system provided in the present invention could analyze the preprocessed image in which the same object is provided with different resolutions in difference locations, and, therefore, capability of object detection could be improved even if the increased computational cost is limited or object detection module applied therein is not changed.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

It is also noted that, in order to make the description be easily understood by those with ordinary skill in the art, a first unit electrically coupled to a second unit means that electronic signals could be transmitted between the first unit and the second unit, and, unless other limitations are made, transmission of the electronic signals could be unidirectional or bidirectional, and transmitting method of the electronic signals could be wired or wireless.

Figure 1:
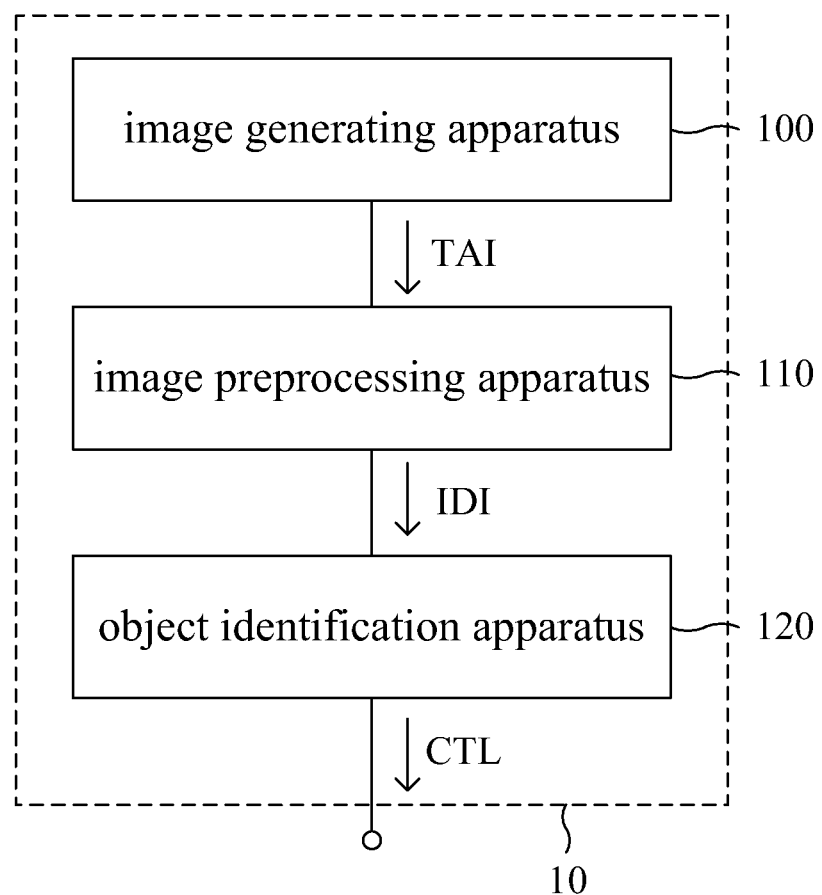
FIG. 1 is a block diagram of a system for detecting object in accordance with one embodiment of the present invention.

Please refer to FIG. 1, which is a block diagram of a system for detecting object in accordance with one embodiment of the present invention. In this embodiment, the object detection system 10 designed for detecting object comprises an image generating apparatus 100, an image preprocessing apparatus 110 and an object identification apparatus 120, wherein the image preprocessing apparatus 110 is electrically coupled to the image generating apparatus 100 and the object identification apparatus 120 so that the image data received from the image generating apparatus 100 could be processed by the image preprocessing apparatus 110, and the processed image data could be transmitted to the object identification apparatus 120 for being used in object identification performed by the object identification apparatus 120. In order to provide clear description of the technique solutions of the present invention, operations performed by the object detection system 10 would be explained with FIG. 2. In different embodiments, the object detection system 10 could be an advanced driver assistance system (ADAS) disposed in a car or a monitoring system disposed at a fixed position.

Figure 2:
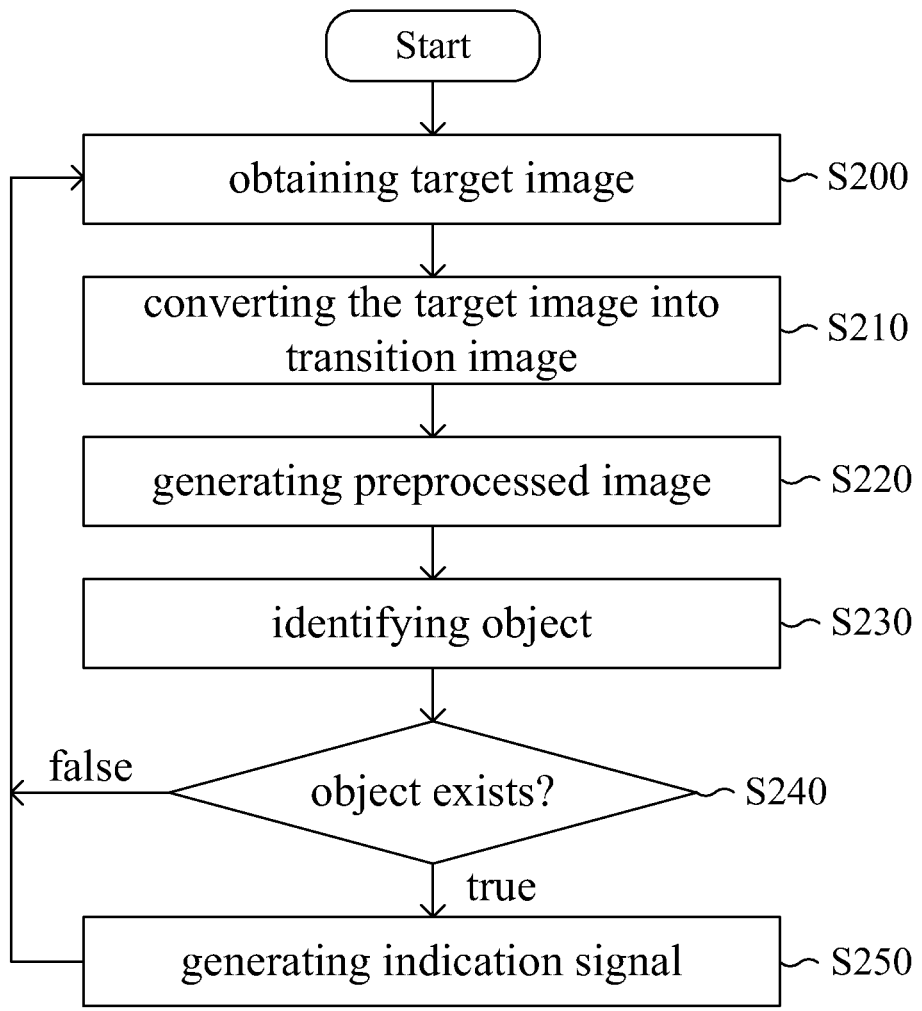
FIG. 2 is a flow chart of a method for detecting object in accordance with one embodiment of the present invention.

Please refer to both FIG. 1 and FIG. 2, wherein FIG. 2 is a flow chart of a method for detecting object in accordance with one embodiment of the present invention. In this embodiment, a target image TAI would be generated by the image generating apparatus 100 in the object detection system 10 when a target area in which existence of a specific object is going to be determined is shot by the image generating apparatus 100, so that the target image TAI could be obtained by the image preprocessing apparatus 110 when it is necessary (Step S200). In another embodiment, the target image TAI generated by the image generating apparatus 100 could be transmitted directly to and stored in the image preprocessing apparatus 110, and the stored target image TAI could be retrieved by the image preprocessing apparatus 110 when it is necessary.

After obtaining the target image TAI through the step S200, the obtained target image TAI would be converted into a transition image by the image preprocessing apparatus 110 (Step S210). In this embodiment, the resolution of the target image TAI is higher than the resolution of the transition image. For example, when the resolution of the target image TAI is 1280*760, the target image TAI could be converted into the transition image whose resolution is 640*360 by any suitable solution performed by the image preprocessing apparatus 110. It is noted that the resolution of the transition image should be lower than that of the target image because a purpose of converting the target image into the transition image is to reduce the computational cost of object identification performed thereafter. It should be known that the resolution of an image represents an amount of pixels included in this image. For example, there are 972800 (1280*760) pixels included in the target image TAI when the resolution of the target image TAI is 1280*760. Furthermore, in this specification, an image data of an image includes a plurality of pixel data which are one to one corresponding to the pixels included in this image.

Figure 3A:
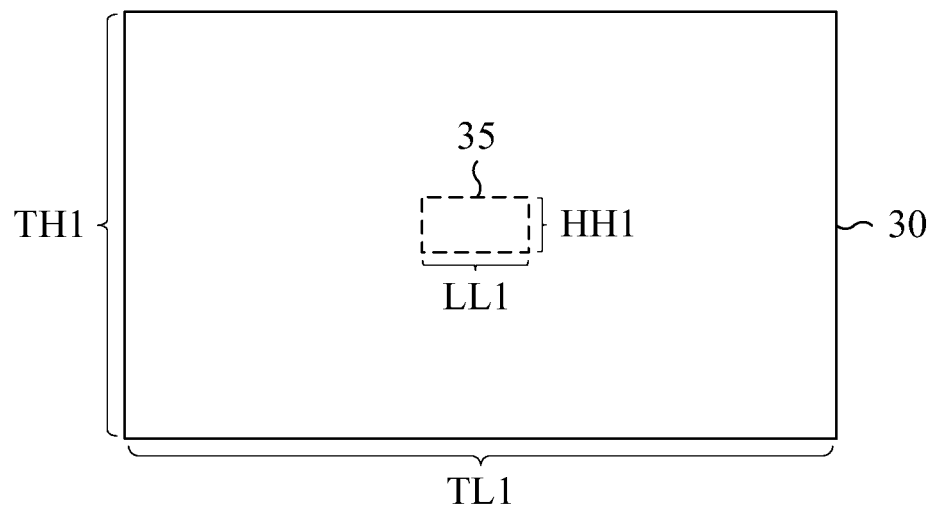
FIG. 3A is a schematic diagram showing a target image in accordance with one embodiment of the present invention.
Figure 4:
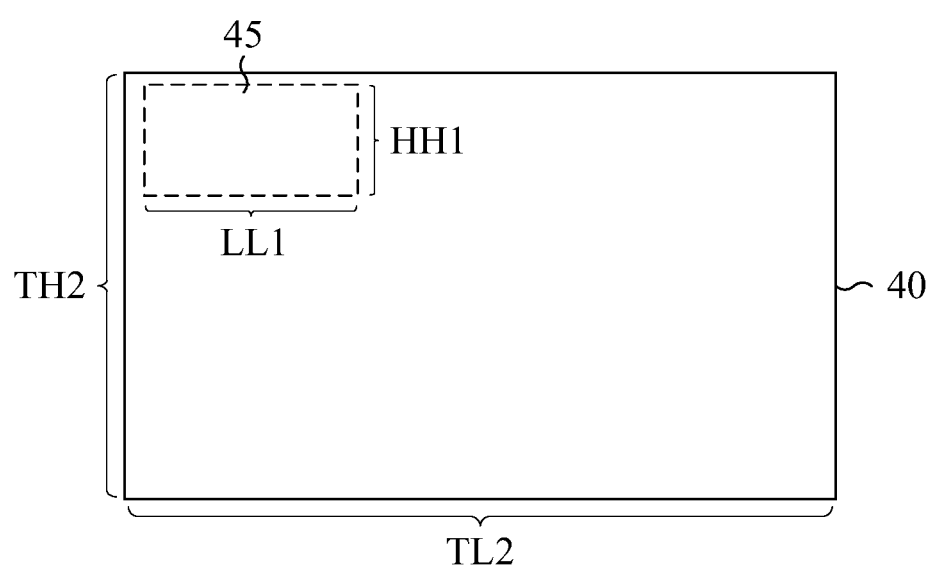
FIG. 4 is a schematic diagram showing a transition image in accordance with one embodiment of the present invention.
Figure 5A:
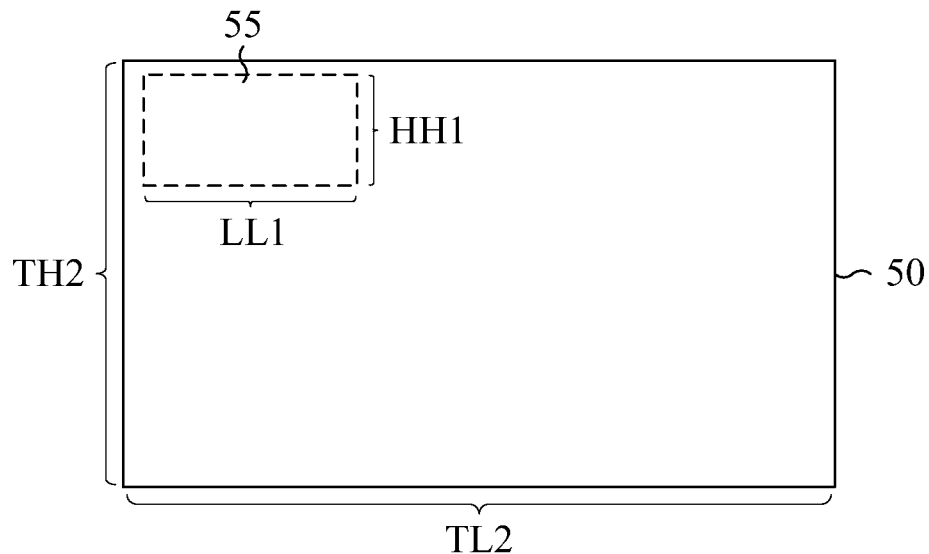
FIG. 5A is a schematic diagram showing a preprocessed image in accordance with one embodiment of the present invention.

After converting the target image TAI into the transition image, the image preprocessing apparatus 110 could generate a preprocessed image IDI, which is going to be provided to the object identification apparatus 120, in accordance with the target image TAI and the transition image converted therefrom (Step S220). Please also refer to FIG. 3A, FIG. 4 and FIG. 5A, wherein FIG. 3A is a schematic diagram showing a target image in accordance with one embodiment of the present invention, FIG. 4 is a schematic diagram showing a transition image in accordance with one embodiment of the present invention, and FIG. 5A is a schematic diagram showing a preprocessed image in accordance with one embodiment of the present invention. In this embodiment, the amount of pixel along a length direction of the target image 30 shown in FIG. 3A is TL1 while the amount of pixel along a height direction of the target image 30 is TH1, the amount of pixel along the length direction of the transition image 40 shown in FIG. 4 is TL2 while the amount of pixel along the height direction of the transition image 40 is TH2, and the amount of pixel along the length direction of the preprocessed image 50 shown in FIG. 4 also is TL2 while the amount of pixel along the height direction of the preprocessed image 50 also is TH2. In other words, the resolution of the target image 30 shown in FIG. 3A is TL1*TH1, and the resolution of the transition image 40 shown in FIG. 4 is TL2*TH2 and is the same as that of the preprocessing image 50 shown in FIG. 5A. As the embodiment described above, when the resolution of the target image 30 is 1280*760 and the resolution of the transition image 40 is 640*360, i.e., the amount of pixel TL1 is 1280, the amount of pixel TH1 is 760, the amount of pixel TL2 is 640 and the amount of pixel TH2 is 360.

When processes of generating the preprocessed image 50 are performed by the image preprocessing apparatus 110, a part of the image data of the transition image 40 would be replaced with a part of the image data of the target image 30. As shown in FIG. 3A, when a more accurate result of object detection is required for a specific target image area 35 of the target image 30, the image data corresponding to the specific target image area 35, i.e., the pixel data of a total of LL1*HH1 pixels included in the specific target image area 35, would be retrieved in the first. After that, the image data corresponding to a specific transition image area 45, which also includes a total of LL1*HH1 pixels, of the transition image 40 shown in FIG. 4 would be replaced by the retrieved pixel data so as to generate the preprocessed image 50 shown in FIG. 5A. Therefore, as illustrated in FIG. 5A, the pixel data included in the preprocessed image 50 are all the same as those included in the transition image 40 except the total of LL1*HH1 pixel data included in the specific transition image area 55, which is located at the same area as the specific transition image area 45 and includes the total of LL1*HH1 pixel data retrieved from the specific target image area 35. It is noted that the specific transition image area 45 and 55 could be set at any suitable position in the image. In one embodiment, the specific transition image area 45 and 55 could be set at the places with less possibility of object existence, such as the surrounding area of an image shot with a fisheye lens.

Please refer to FIG. 1 and FIG. 2 again. After generating the preprocessing image IDI in the step S220 from the image preprocessing apparatus 110 by applying the technique solutions described above or any other suitable approaches, the preprocessing image IDI would be provided to the object identification apparatus 120 so that object detection could be performed by the object identification apparatus 120 with preset object identification module (Step S230). After completing the object detection, a determination is performed in the step S240. When no object complying with at least one condition predetermined by the object identification module is found through the object detection performed in the step S230, a determination result of the step S240 would be false, and the flow goes back to the step S200 to deal with next target image. On the contrary, when at least one object is found through the object detection performed in the step S230, the determination result of the step S240 would be true, and the flow goes to the step S250 in which an indication signal CTL is generated to indicate a position where the found object is located in the preprocessed image.

There are many solutions could be used for realizing the process of indicating the position of the found object in accordance with the indication signal CTL. For example, a voice could be used to give warnings or instructions about relative distance or direction between the object and the image generating apparatus 100, or a display apparatus could be applied to display the position where the object is. Please refer to FIG. 6, which is a block diagram of a system for detecting object in accordance with another embodiment of the present invention. Compared to the object detection system 10 shown in FIG. 1, the object detection system 60 further comprises a display apparatus 600. Operations performed by the image generating apparatus 100, the image preprocessing apparatus 110 and the object identification apparatus 120 in the object detection system 60 are similar to those performed in the object detection system 10, and operations related to the display apparatus 600 will be described below.

Figure 6:
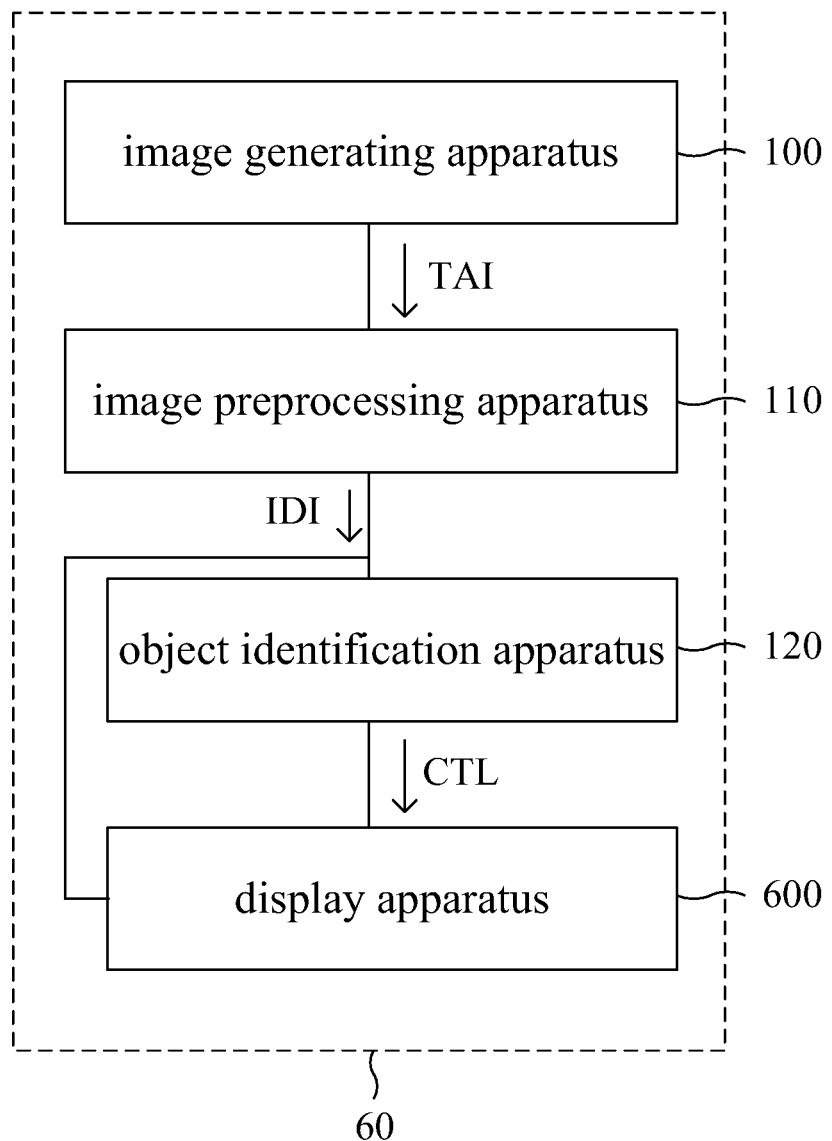
FIG. 6 is a block diagram of a system for detecting object in accordance with another embodiment of the present invention.

As shown in FIG. 6, the display apparatus 600 is electrically coupled to the image preprocessing apparatus 110 and the object identification apparatus 120. The display apparatus 600 receives the preprocessed image TDI from the image preprocessing apparatus 110 and receives the indication signal CTL from the object identification apparatus 120. Furthermore, the display apparatus 600 determines how to adjust the received preprocessed image TDI in accordance with the received indication signal CTL before displaying the received preprocessed image TDI. For example, when no object is found by the object identification apparatus 120, the object identification apparatus 120 would not submit the indication signal CTL or the submitted indication signal CTL would indicate that no object is found, and, therefore, the display apparatus 600 could display the received preprocessed image TDI without performing any adjustment thereon. On the contrary, when at least one object is found by the object identification apparatus 120, the indication signal CTL could be set by the object identification apparatus 120 to indicate the pixels included in the object, and, therefore, the display apparatus 600 could display the object in the preprocessed image in a conspicuous manner in accordance with the indication signal CTL. For example, the pixels included in the object or outline of the object could be set to a predetermined color so that the object is displayed in a conspicuous manner.

Some adjustments might be made to the technique solutions provided above due to different sizes of the specific target image area 35. For example, when the amount of pixels included in the specific target image area 35 is greater than the amount of pixels of one replaceable area in which the pixel data included could be replaced with those included in the specific target image area 35, it is possible to divide the specific target image area 35 into at least two specific target image subarea so that the amount of pixels included in each of the specific target image subarea could fit the amount of pixels included in one replaceable area, and, at the same time, a plurality of replaceable areas should be prepared in the transition image so that there are enough space for placing the pixel data included in all the at least two specific target image subareas. The replaceable areas, such as the specific transition image area 45 shown in FIG. 4, could be set at corners of the transition image 40. Please refer to FIG. 3B, which is a schematic diagram showing a target image in accordance with another embodiment of the present invention. In this embodiment, the size of the area covered by the specific target image subarea 300 and 310 is the same as the size of the area covered by the specific target image area 35, and the size of the area covered by the specific target image subarea 300 and the size of the area covered by the specific target image subarea 310 are both smaller than the size of the area covered by the specific target image 35 shown in FIG. 3A. In other words, the amount of pixels included in the specific target image subarea 300 is less than that included in the specific target image area 35, and the amount of pixels included in the specific target image subarea 310 is also less than that included in the specific target image area 35. Furthermore, the amount of pixels included in the specific target image subarea 300 and that included in the specific target image subarea 310 is the same as the amount of pixels included in the replaceable areas corresponding thereto. Furthermore, in order to reduce the result that the object cannot be normally identified because the image of the object is cut and divided into different subareas, the specific target image subarea 300 is designed to be partially overlapped with the specific target image subarea 310. Specifically, in this embodiment, the amount of pixel H1 along the height direction of the specific target image subarea 300 and the amount of pixel H2 along the height direction of the specific target image subarea 310 both are the same as the pixel amount HH1 shown in FIG. 3A, and summation of the amount of pixel L1 along the length direction of the specific target image subarea 300 and the amount of pixel L2 along the length direction of the specific target image subarea 310 is greater than the pixel amount LL1 shown in FIG. 3A. In further embodiments, the size of the area where the specific target image subarea 300 overlaps with the specific target image subarea 310 is designed to be larger than the size of the object to prevent the object from being not identified normally.

Figure 3B:
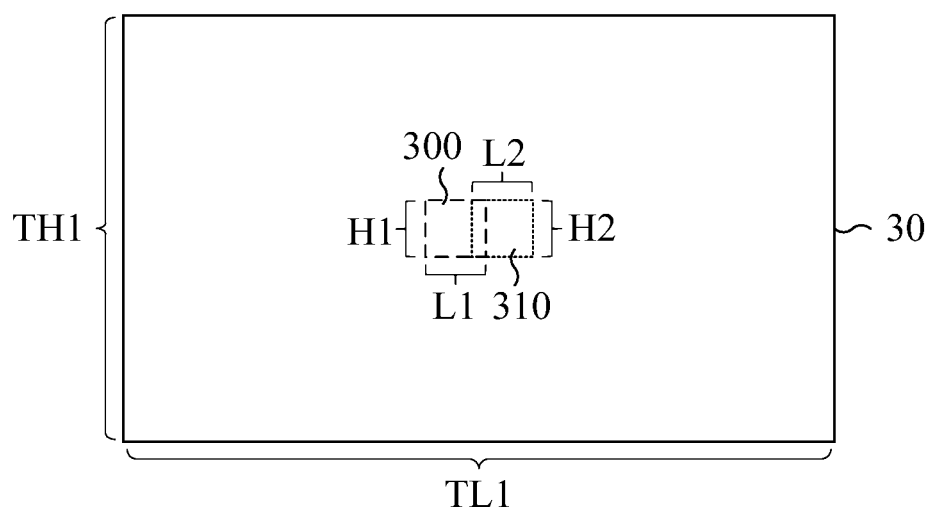
FIG. 3B is a schematic diagram showing a target image in accordance with another embodiment of the present invention.
Figure 5B:
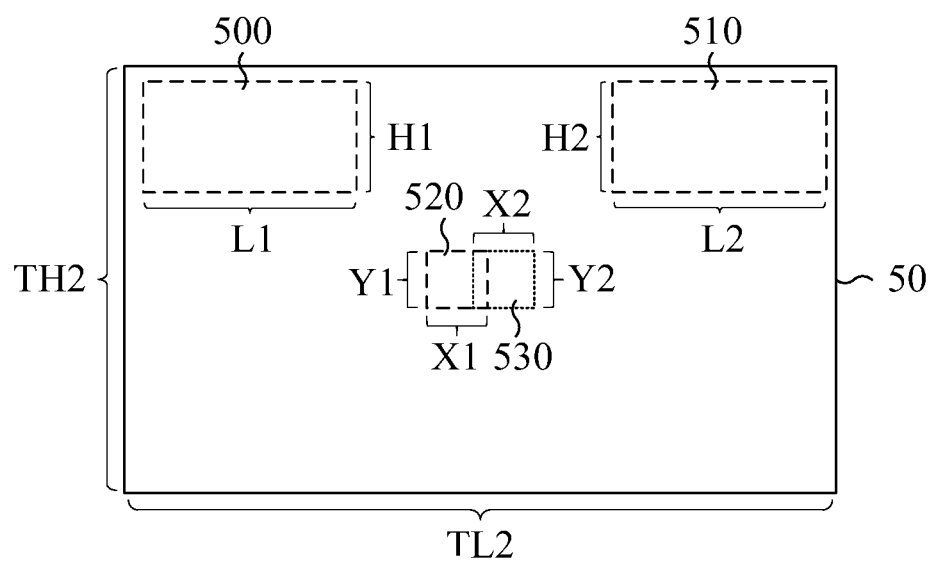
FIG. 5B is a schematic diagram showing a preprocessed image in accordance with another embodiment of the present invention.

Please refer to FIG. 3B and FIG. 5B, wherein FIG. 5B is a schematic diagram showing a preprocessed image in accordance with another embodiment of the present invention. In the embodiment shown in FIG. 5B, the preprocessed image 50 comprises a specific transition image area 500 and a specific transition image area 510, wherein the specific transition image area 500 is used for storing the pixel data retrieved from the specific target image subarea 300 shown in FIG. 3B, and the specific transition image area 510 is used for storing the pixel data retrieved from the specific target image subarea 310 shown in FIG. 3B. Moreover, the preprocessed image 50 shown in FIG. 5B also illustrates a corresponded area 520 and a corresponded area 530. Boundaries of the images shown in the corresponded area 520 is the same as that shown in the specific target image subarea 300, and boundaries of the images shown in the corresponded area 530 is the same as that shown in the specific target image subarea 310. When the resolution of the preprocessed image 50 in each direction is half of that of the target image 30, i.e., the pixel amount TH2 is half of the pixel amount TH1 and the pixel amount TL2 is half of the pixel amount TL1, the pixel amount X1 along the length direction of the corresponded area 520 should be half of the pixel amount L1 along the length direction of the specific target image subarea 300, the pixel amount Y1 along the height direction of the corresponded area 520 should be half of the pixel amount H1 along the length direction of the specific target image subarea 300, the pixel amount X2 along the length direction of the corresponded area 530 should be half of the pixel amount L2 along the length direction of the specific target image subarea 310, and the pixel amount Y2 along the height direction of the corresponded area 530 should be half of the pixel amount H2 along the height direction of the specific target image subarea 310.

When the pixel data within the specific transition image subarea 500 or 510 are replaced with the pixel data within the target image 30, adjustments could be made to the image displayed by the display apparatus 600 shown in FIG. 6 in accordance with the area in which the object is identified. For example, an object, which is found by performing object identification with the pixel data except those stored in the specific transition image subareas 520 and 530, could be displayed in a conspicuous manner at the location where it is identified, and, on the contrary, when the object is found by using the pixel data stored in the specific transition image subarea 500 or 510, a corresponded object, which is located in the corresponded area 520 or 530 and corresponded to the identified object, but not the identified object itself is displayed in a conspicuous manner. In one embodiment, a coordinate mapping method could be applied for mapping the location of the identified object within the specific transition image subarea 500 or 510 to a corresponded location within the corresponded area 520 or 530. Therefore, when the object found by using the pixel data stored in the specific transition image subarea 500 is also found by using the pixel data stored in the corresponded area 520, the adjustments in order to display the object in the conspicuous manner could be made only once without repeating the same adjustment operation twice.

It is noted that the pixel amount and area of the specific target image area could be set freely in accordance with actual needs. For example, the specific target image area could be located at upper middle of the target image when the object detecting system 10 or 60 is a part of the advanced driver assistance system (ADAS), so that more details about the objects far away from the vehicle could be remained and the effect of increasing the distance of detecting objects could be achieved. In another aspect, the position of the specific transition image area also could be set freely in accordance with actual needs. Specifically, because it is very possible that black blocks generated due to lack of image data would be formed near edges around the target image shot with a fisheye lens, the specific transition image areas could be set within the black blocks, such as the upper left corner, the upper right corner, the lower left corner or the lower right corner of the target image, so that the image data used for object identification would not be significantly affected.

By using the technique solutions described above, the method and system provided in the present invention could generate a preprocessed image in which the resolution of an object within a specific transition image area is difference from the resolution of the same object in the areas other than the specific transition image area. Accordingly, object detection performed by the method and system provided in the present invention could analyze the preprocessed image in which the same object is provided with different resolutions in difference locations, and, therefore, capability of object detection could be improved even if the increased computational cost is limited or object detection module applied therein is not changed.

What is claimed is:

1. A system for detecting object, which is characterized in comprising:
   an image generating apparatus adapted to generate a target image corresponding to a target area;
   an image preprocessing apparatus electrically coupled to the image generating apparatus to receive the target image generated by the image generating apparatus, wherein, by the image preprocessing apparatus, the target image with a first resolution is converted into a transition image with a second resolution, and a preprocessed image is generated by replacing a predetermined amount of pixel data included in a specific transition image area of the transition image with the predetermined amount of pixel data included in a specific target image area of the target image; and
   an object identification apparatus electrically coupled to the image preprocessing apparatus to receive the preprocessed image generated thereby and, while an object complying with at least one predetermined condition is determined to be existed in the preprocessed image, generating an indication signal for indicating a position of the object,
   wherein, the second resolution is lower than the first resolution.

2. The system according to claim 1, wherein the specific target image area is located at upper middle of the target image, and the specific transition image area is located at upper left corner or upper right corner of the transition image.

3. The system according to claim 1 further comprising a display apparatus, wherein the display apparatus is electrically coupled to the image preprocessing apparatus and the object identification apparatus, the display apparatus receives the preprocessed image from the image preprocessing apparatus, receives the indication signal from the object identification apparatus, and determines, in accordance with the indication signal, how the preprocessed image is adjusted before displaying the preprocessed image.

4. The system according to claim 3, wherein the display apparatus displays the object in the preprocessed image in a conspicuous manner when the indication signal indicates that the object exists.

5. The system according to claim 1, wherein the specific target image area comprises a first specific target image subarea and a second specific target image subarea, and the first specific target image subarea is partially overlapped with the second specific target image subarea.

6. A method for detecting object, which is characterized in comprising:
   obtaining a target image with a first resolution;
   converting the target image into a transition image with a second resolution, wherein the second resolution is lower than the first resolution;
   generating a preprocessed image by replacing a predetermined amount of pixel data included in a specific transition image area of the transition image with the predetermined amount of pixel data included in a specific target image area of the target image;
   determining whether an object complying with at least one predetermined condition exists in the preprocessed image; and
   generating an indication signal for indicating a position of the object when the object is determined to be existed in the preprocessing image.

7. The method according to claim 6, wherein the specific target image area is set to be located at upper middle of the target image, and the specific transition image area is set to be located at upper left corner or upper right corner of the transition image.

8. The method according to claim 6, further comprising:
   determining, in accordance with the indication signal, how the preprocessed image is adjusted before the preprocessed image is displayed.

9. The method according to claim 8, wherein the object in the preprocessed image is displayed in a conspicuous manner when the indication signal indicates that the object exists.

10. The method according to claim 6, wherein the specific target image area comprises a first specific target image subarea and a second specific target image subarea, and the first specific target image subarea is partially overlapped with the second specific target image subarea.

* * * * *